(12) United States Patent
Tabanou et al.

(10) Patent No.: US 7,073,609 B2
(45) Date of Patent: Jul. 11, 2006

(54) APPARATUS AND METHODS FOR IMAGING WELLS DRILLED WITH OIL-BASED MUDS

(75) Inventors: Jacques R. Tabanou, Houston, TX (US); Dzevat Omeragic, Sugar Land, TX (US); Jean Seydoux, Sugar Land, TX (US); Attilio C. Pisoni, Houston, TX (US)

(73) Assignee: Schlumberger Technology Corporation, Sugar Land, TX (US)

( * ) Notice: Subject to any disclaimer, the term of this patent is extended or adjusted under 35 U.S.C. 154(b) by 218 days.

(21) Appl. No.: 10/674,179

(22) Filed: Sep. 29, 2003

(65) Prior Publication Data

US 2005/0067190 A1    Mar. 31, 2005

(51) Int. Cl.
*E21B 47/026* (2006.01)
(52) U.S. Cl. ..................... 175/50; 166/254.2
(58) Field of Classification Search ............. 175/50, 175/40; 166/250.16, 254.2; 73/152.02, 73/152.03, 152.43
See application file for complete search history.

(56) References Cited

U.S. PATENT DOCUMENTS 3,973,181 A    8/1976   Calvert
5,235,285 A    8/1993   Clark et al.
5,924,499 A *  7/1999   Birchak et al. ............... 175/40
6,188,223 B1 * 2/2001   Van Steenwyk et al. .... 324/370
6,191,588 B1   2/2001   Chen
6,253,848 B1 * 7/2001   Reimers et al. .......... 166/254.1
6,534,986 B1 * 3/2003   Nichols ...................... 324/339
6,600,321 B1   7/2003   Evans

FOREIGN PATENT DOCUMENTS

GB    2 353 596        2/2001
GB    2 379 511        3/2003
WO    WO 00/04405      1/2000

* cited by examiner

*Primary Examiner*—Kenneth Thompson
(74) *Attorney, Agent, or Firm*—Kevin P. McEnaney; Bryan L. White; Victor H. Segura

(57) ABSTRACT

A resistivity logging sensor for logging while drilling a well using an oil-based mud includes a sensor body; a first current injector electrode disposed on the sensor body, wherein the first current injector electrode is electrically insulated from the sensor body; at least two current return electrodes disposed on the sensor body at a selected distance from the first current injector electrode, wherein the at least two current return electrodes are disposed proximate to each other and are electrically insulated from the sensor body; and an electrical source configured to energize the first current injector electrode with a current having a voltage of no less than 50 mvolts and a frequency of no less than 1 KHz.

33 Claims, 11 Drawing Sheets

APPARATUS AND METHODS FOR IMAGING WELLS DRILLED WITH OIL-BASED MUDS

CROSS-REFERENCE TO RELATED APPLICATIONS

Not applicable.

STATEMENT REGARDING FEDERALLY SPONSORED RESEARCH OR DEVELOPMENT

Not applicable.

BACKGROUND OF THE INVENTION

1. Field of the Invention

The invention relates generally to resistivity logging tools. More particularly, the invention relates to tools and methods of resistivity measurements in wells drilled with oil-based muds.

2. Background Art

In order to minimize the effect of water coning, the number of high angle (deviated) and horizontal wells drilled in small and complex reservoirs has increased significantly over the past years. Many of these reservoirs comprise a series of small targets that on their own would not be economical to drill. To make drilling such reservoirs economical, the industry has developed directed drilling techniques to drill deviated or horizontal wells.

Many tools for drilling deviated or horizontal wells are available. Examples include the geosteering tool sold under the trade name of GST™ by Schlumberger Technology Corporation (Houston, Tex.). The GST™ tool provides azimuthal resistivity measurements close to the drilling bit. The azimuthal resistivity measurements can be used to steer the drill bit to follow a path to the hydrocarbon zones and stay away from water zones. The GST™ tool can also determine whether the well path is getting out of the pay zone.

U.S. Pat. No. 5,235,285 issued to Clark et al. and assigned to the assignee of the present invention discloses a tool that measures the resistivity at the bit. Examples of tools based on this and related principles include one sold under the trade name of RAB™ (resistivity at the bit) and another sold under the trade name of GVR™ (geovision resistivity) by Schlumberger Technology Corporation (Houston, Tex.). These tools are capable of delivering full borehole resistivity images of the reservoir rock being drilled. This capability makes it possible to detect small geological structures or thin formation layers while drilling and allows one to image reservoir structural and stratigraphic dips. Being able to detect and visualize the well path while drilling is crucial in placing the well in the proper location—to stay within the pay zone and to avoid crossing the boundary.

Unfortunately, these tools, GST™, RAB™, and GVR™, are limited to wells drilled with water-based mud (WBM), while most high-angle and horizontal wells are drilled with oil-based mud (OBM). All these tools, GST™, RAB™ and GVR™, are based on low frequency electrode devices that generally do not operate in wells drilled with OBM.

In the past, in order to measure formation dips in wells drilled with OBM, some tools (e.g., a standard dipmeter) have been equipped with "scratchers" to remove resistive mud cakes in order to improve electrical contacts between the rock formation and the electrodes.

The first device developed specifically for the measurements of formation dips in wells drilled with OBM was an OBM dipmeter based on capacitive coupling. One example of such an OBM dipmeter is disclosed in U.S. Pat. No. 3,973,181 issued to Calvert and assigned to the assignee of the present invention.

This device operates at high frequency (10 MHz) to minimize the effect of standoffs. A single guarded (insulated) button was mounted on each of the four pads of a standard dipmeter. Thus, this tool can image four sectors of the borehole; however, it does not have enough coverage of the borehole to provide full borehole images.

Later, a new sensor, an OBM dipmeter, was disclosed in U.S. Pat. No. 4,780,678 issued to Kleinberg et al. and assigned to the assignee of the present invention. This new OBM dipmeter operates at a frequency of around 50 MHz. It uses a differential induction coil system that responds primarily to the contrast in resistivity between adjacent layers. As such, this tool has the capability to measure formation dip in OBM, but it has no imaging capability. A tool based on this technique is sold under the trade name of OBDT™ by Schlumberger Technology Corporation (Houston, Tex.).

More recently, an Oil Base Mud Imager was disclosed in U.S. Pat. No. 6,191,588 B1 issued to Chen and assigned to the assignee of the present invention. A tool based on this techniques is sold by Schlumberger under the trade name of OBMI™. This tool provides for the first time a true borehole image in wells drilled with OBM. A similar resistivity tool that can be used to image a well drilled with OBM is disclosed in U.S. Pat. No. 6,600,321 B2 issued to Evans. This tool is capable of providing wellbore resistivity determinations and imaging based on capacitive coupling.

All the tools described above are wireline tools. While progress has been made in the development of wireline OBM tools, the development of logging-while-drilling (LWD) or measurement-while-drilling (MWD) OBM resistivity tools has been relatively slower. The only LWD/MWD tool capable of providing images of wells drilled with OBM is the azimuthal density neutron tool sold under the trade name of ADN™ by Schlumberger Technology Corporation (Houston, Tex.). However, ADN™ can only provide a 16-sector density image. Moreover, the densities of typical rock formations have a more limited range, typically 2 to 3 g/cc, as compared to the range of resistivities, typically 0.2 to 2000 ohm-meter. Therefore, an imaging tool based on resistivity is more desirable.

Furthermore, a logging sensor used on an LWD tool may not be able to maintain contact with the borehole wall at all times. Tool standoffs may reduce the accuracy of the measurements. Therefore, it is desirable that a sensor to be used on an LWD tool have the ability to minimize or eliminate the standoffs.

SUMMARY OF THE INVENTION

One aspect of the invention relates to a sensor for logging a formation resistivity while drilling a well using an oil-based mud. A resistivity logging sensor in accordance with one embodiment of the invention includes a sensor body; a first current injector electrode disposed on the sensor body, wherein the first current injector electrode is electrically insulated from the sensor body; at least two current return electrodes disposed on the sensor body at a selected distance from the first current injector electrode, wherein the at least two current return electrodes are disposed proximate to each other and are electrically insulated from the sensor body; and an electrical source configured to energize the first current injector electrode with a current having a voltage of no less than 50 mvolts and a frequency of no less than 1 KHz.

One aspect of the invention relates to a method for determining a formation property. A method in accordance with one embodiment of the invention includes injecting a current into a formation by energizing a current injector electrode; measuring a property of a first current returning to a first current return electrode disposed at a distance from the current injector electrode; measuring a property of a second current returning to a second current return electrode disposed proximate the first current return electrode; and determining the formation property from a difference measurement derived from the property of the first current and the property of the second current.

One aspect of the invention relates to a method for determining a formation property. A method in accordance with one embodiment of the invention includes injecting a first current into a formation by energizing a first current injector electrode; measuring a property of a first current returning to a first current return electrode disposed at a distance from the first current injector electrode; measuring a property of a second current returning to a second current return electrode disposed proximate the first current return electrode; injecting a second current into the formation by energizing a second current injector electrode; measuring a property of a third current returning to the first current return electrode; measuring a property of a fourth current returning to the second current return electrode; and determining the formation property from a difference measurement derived from the property of the first current, the property of the second current, the property of the third current, and the property of the fourth current.

Other aspects and advantages of the invention will be apparent from the following description and the appended claims.

DETAILED DESCRIPTION

Embodiments of the invention relate to apparatus and methods for resistivity measurements and formation imaging. A tool in accordance with embodiments of the invention is capable of operating in oil-based muds (OBM) and may be used while drilling. In addition, embodiments of the invention can monitor and/or minimize the tool standoff effects.

A resistivity logging tool can be based on one of the two sensor mechanisms: electrical dipoles (using generally metallic electrodes) and magnetic dipoles (using generally induction coils or resonant cavities at VHF). Embodiments of the invention relate to tools using metallic electrode sensors.

Due to high resistivities of typical OBM ($R_m$>1000 ohm-meters), it is necessary to use current sources capable of high-operating frequencies. With high frequencies, it becomes possible to drive sufficient currents by capacitive coupling through the insulating muds and into rock formations, and to collect currents returning to the electrodes on the tools also by capacitive coupling. This idea is disclosed in U.S. Pat. No. 3,973,181 issued to Calvert and assigned to the assignee of the present invention. Examples of tools that work with this principle include a capacitive OBM dipmeter sold under the name of OBDT™ by Schlumberger Technology Corporation (Houston, Tex.).

In accordance with embodiments of the invention, new LWD or MWD sensors are deigned to be able to operate in OBM. These new sensors are capable of providing formation images for geosteering as well as other geological applications. The LWD sensors of the invention are based on a configuration similar to the original RAB configuration, which was designed to operate in water-based muds (WBM). Thus, embodiments of the invention are referred to as HFRAB (high frequency RAB) in the following description.

Figure 1A:
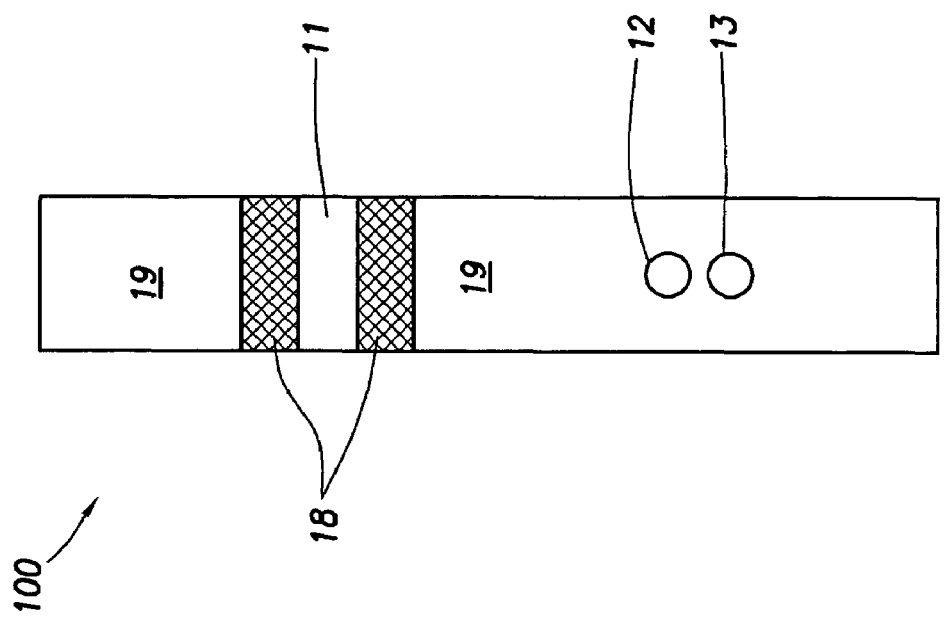
FIG. 1A shows a resistivity logging sensor in accordance with one embodiment of the invention.

FIG. 1A shows an HFRAB 100 in accordance with embodiments of the invention. This HFRAB is a modification of a prior art RAB sensor. In the HFRAB 100 shown, a ring electrode 11 is disposed on the drill collar 19, but insulated from the drill collar 19 using a suitable insulating material 18. The ring electrode 11 acts as a current source (current injector) in a manner similar to a toroidal transmitter of the RAB™ disclosed in U.S. Pat. No. 5,235,285. Although a ring electrode is expected to be more efficient at high frequencies, embodiments of the invention may also use a troroidal transformer, like the RAB™.

In accordance with embodiments of the invention, a selected voltage difference (e.g., 100V) is applied between the current injector electrode 11 and the surrounding drill collar 19. In preferred embodiments, the applied voltage is between 50 mV and 1000 volts, more preferably about 100 volts. The voltage difference forces a current to flow from the current injector electrode 11 through the borehole into the formation and finally returns to the button electrodes 12 and 13. While the current return electrodes are shown as button electrodes in FIGS. 1A, one of ordinary skill in the art would appreciate that these electrodes may have other configurations, such as ring electrodes or toroidal transformers. Accordingly, these electrodes will be generally referred to as "current return electrodes."

In preferred embodiments, the current return electrodes are button electrodes because they can provide good vertical resolution and azimuthal sensitivity. In accordance with embodiments of the invention, the currents for current injector electrode 11 are applied at relatively high frequencies (e.g., about 1 KHz–about 1.5 GHz, preferably between 1 MHz and 500 MHz, and more preferably about 50 MHz). Capacitive coupling is more efficient at higher frequencies. As a result, the contribution of mud impedance is smaller relative to the impedance constituted by the rock formation at higher frequencies.

Figure 1B:
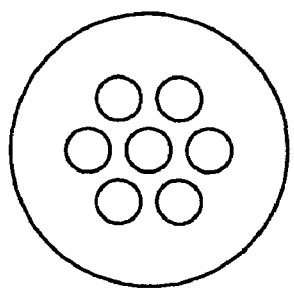
FIG. 1B shows an electrode array for a resistivity logging sensor in accordance with one embodiment of the invention.

In preferred embodiments of the invention, two or more current return electrodes are provided on each tool. For example, in the HFRAB 100 shown in FIG. 1A, two current return electrodes 12 and 13 are included. The two or more current return electrodes preferably are arranged in proximity such that their borehole effects are similar. In addition, close proximity of these electrodes provides better resolution. If more than two electrodes are included, they may be organized in an array as shown in FIG. 1B.

Figure 2:
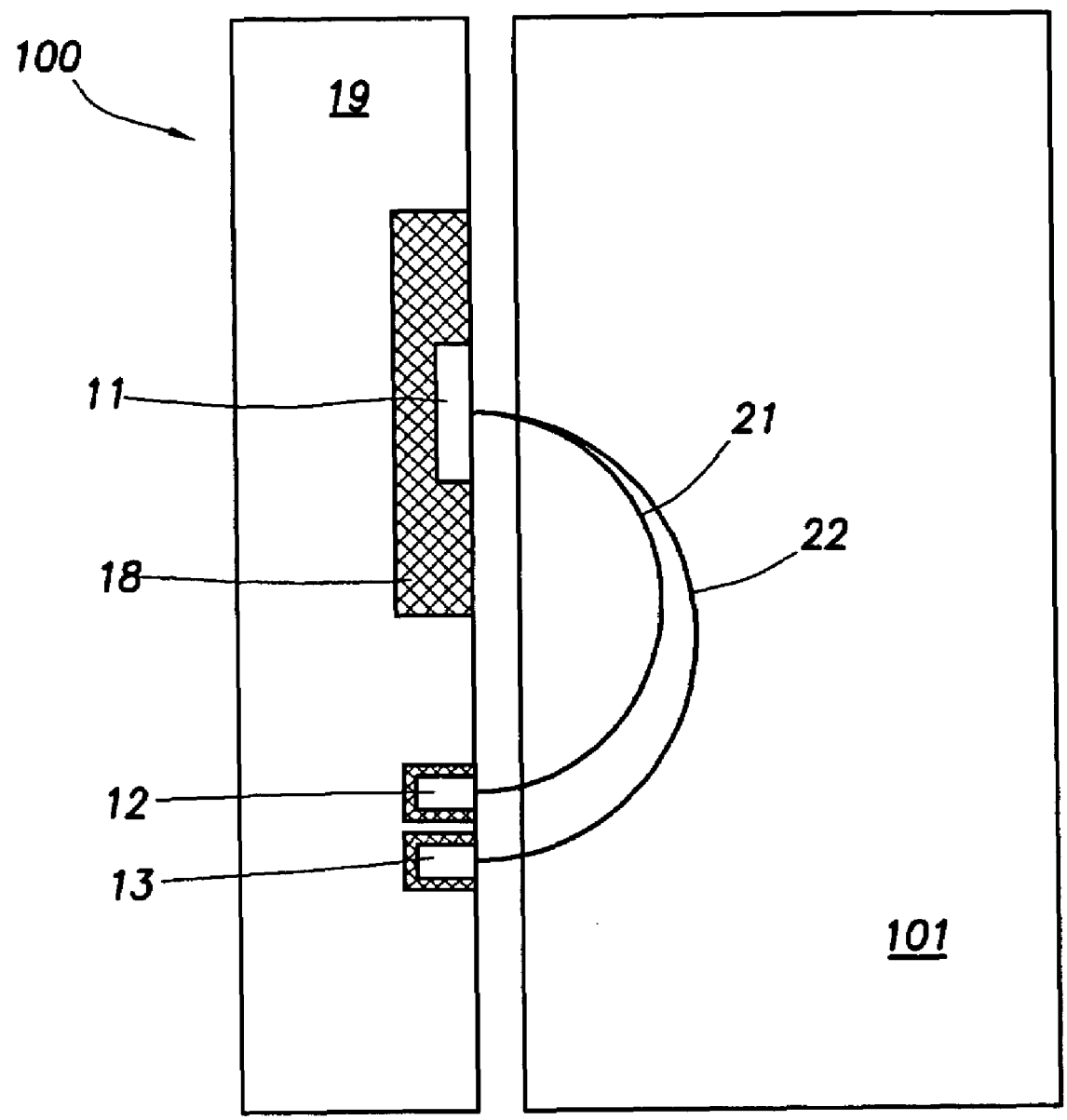
FIG. 2 shows a resistivity logging sensor in accordance with one embodiment of the invention in the process of logging a formation.

The exact dimensions of the tool shown in FIG. 1A may vary depending on the desired application. FIG. 2 shows a sectional view of an exemplary tool configuration in accordance with one embodiment of the invention. As shown, the current injector electrode 11 comprises a ring of about 1 to 5 inches wide embedded in an insulating material 18 disposed around the periphery (in a recess about 3 to 15 inches wide) of tool collar 19. The current return electrodes 12 and 13, each comprising a button having a ½-inch diameter, are preferably embedded in insulating materials with a separation of about 1.00 inches between the centers of the two electrodes. Also shown are conductive paths 21 and 22. The conductive path 21 leads from the current injector electrode 11 into formation 101 and returns to the current return electrode 12, while the conductive path 22 leads from the current injector electrode 11 into the formation 101 and returns to the current return electrode 13.

Figure 3:
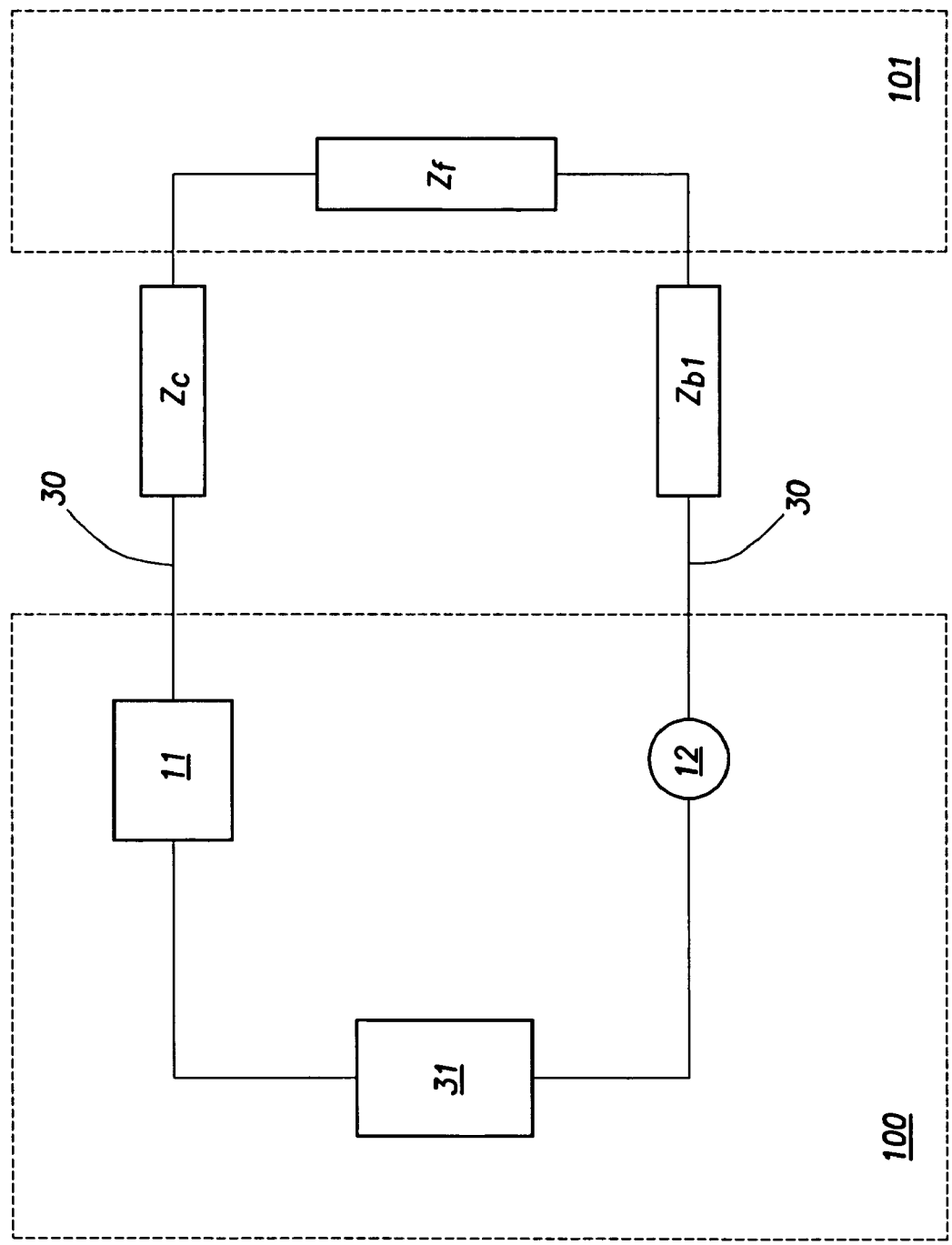
FIG. 3 shows a schematic of various impedance encountered by a current injected into a formation and returning to an electrode.

FIG. 3 shows a schematic of impedances encountered by the currents flowing along a conductive path. With reference to the conductive path 21 in FIG. 2, an electrical source 31 is applied to the current injector electrode 11, which then emits a current 30. The emitted current 30 first encounters the impedance of the mud ($Z_c$) in front of the current injector electrode 11. The current 30 then enters the formation 101 and encounters the impedance of the formation ($Z_f$). The current 30 finally exits the formation 101 and encounters the mud impedance ($Z_{b1}$) in front of the current return electrode 12 before returning to the current return electrode 12, which is referred to as the first button electrode (b1) in the schematic of FIG. 3. The total impedance along the conductive path 21 may be derived from a ratio of the voltage (V) of the current injected into the formation 101 by the current injector electrode 11 and the measured current magnitude ($I_{b1}$) at the current return electrode 12. Thus, the total impedance $$\left(\frac{V}{I_{b1}}\right)$$

is a summation of the three impedances, $Z_c$, $Z_f$, and $Z_{b1}$ along the conductive path 21, i.e., $$\frac{V}{I_{b1}} = Z_C + Z_f + Z_{b1}. \tag{1}$$

Note that if the tool is operated with a relatively high frequency current, then the mud impedances become negligible relative to the formation impedance, i.e., $Z_f >> Z_c$ and $Z_{b1}$. As a result, $$\frac{V}{I_{b1}} \approx Z_f.$$

The formation impedance $Z_f$ is a function of both rock formation resistivity and dielectric constant.

Similarly, the total impedance $$\left(\frac{V}{I_{b2}}\right)$$

along the conductive path 22, which returns the current to current return electrode 13 (see FIG. 2), which is referred to as the second button electrode (b2) in the following equation, is a summation of the four impedances, $Z_c$, $Z_f$, $\Delta Z_{f12}$, and $Z_{b2}$, along this path. Therefore, $$\frac{V}{I_{b2}} = Z_C + Z_f + \Delta Z_{f12} + Z_{b2} \tag{2}$$

where V is the voltage of the current emitted from the current injector electrode 11, $I_{b2}$ is the current measured at current return electrode 13, $Z_c$ is the impedance of the mud in front of the current injector electrode 11, $Z_f$ is the impedance of the formation corresponding to the section traversed by the conductive path 21, $\Delta Z_{f12}$ is the impedance of the additional section of the formation that the conductive path 22 needs to traverse, and $Z_{b2}$ is the impedance of mud in front of the current return electrode 13.

Taking the difference between equations (2) and (1) yields:

$$\frac{V}{I_{b2}} - \frac{V}{I_{b1}} = \tag{3}$$

$$(Z_C + Z_f + \Delta Z_{f12} + Z_{b2}) - (Z_C + Z_f + Z_{b1}) = \Delta Z_{f12} + Z_{b2} - Z_{b1}$$

If the standoffs in front of the current return electrodes 12 and 13 are approximately identical, then $Z_{b2} \approx Z_{b1}$. By placing the two current return electrodes in close proximity, this condition is likely met. Equation (3) can then be simplified to:

$$\frac{V}{I_{b2}} - \frac{V}{I_{b1}} = \Delta Z_{f12} \qquad (4)$$

Thus, a difference impedance measurements from the two current return electrodes (e.g., the button electrodes 12 and 13 in FIG. 1A) will provide an impedance of the rock formation located proximate to the two current return electrodes. Note that the contributions from mud impedances completely cancel out in Equation (4). As a result, the difference impedance measurements shown in Equation (4) is immune to tool standoff effects. This provides a convenient means to measure formation impedance that is independent of tool standoffs as long as the mud impedance in from of the two current return electrodes are similar ($Z_{b2} \approx Z_{b1}$) or their difference is insignificant relative to the formation impedance ($|Z_{b2} - Z_{b1}| \ll Z_f$).

Note that the section of the formation that contributes to $\Delta Z_{f12}$ is a function of the separation between the two measuring electrodes. Therefore, the vertical resolution of such difference measurements depends on the physical separation between the measuring electrodes. In some embodiments of the invention, the measurement electrodes are disposed in proximity to each other to enable high-resolution imaging of the formation. For example, in the embodiment shown in FIG. 2, the two measurement electrodes are arranged 1.00 inches apart. This sensor should be able to provide borehole images with a resolution on the order of 1 or 2 inches.

For clarity, current or voltage measurements in this description are described as amplitude measurements. However, those skilled in the art would appreciate that all measurements are actually complex numbers because they are made with an alternating current (AC) having a finite frequency and, therefore, the measured signals may be phase-shifted with respect to an arbitrary but fixed reference. Therefore, in addition to amplitudes, other characteristics of the signals may also be measured, such as the real parts (i.e., the in-phase components) or the imaginary parts (i.e., the quadrature components) of the signals. Accordingly, the difference measurement described above may be a phase-shift difference, an amplitude difference (attenuation), or an amplitude ratio (measured in dB). The amplitude ratio is also a difference measurement, but it is equivalent to a difference between the logarithm of the amplitudes.

Figure 4:
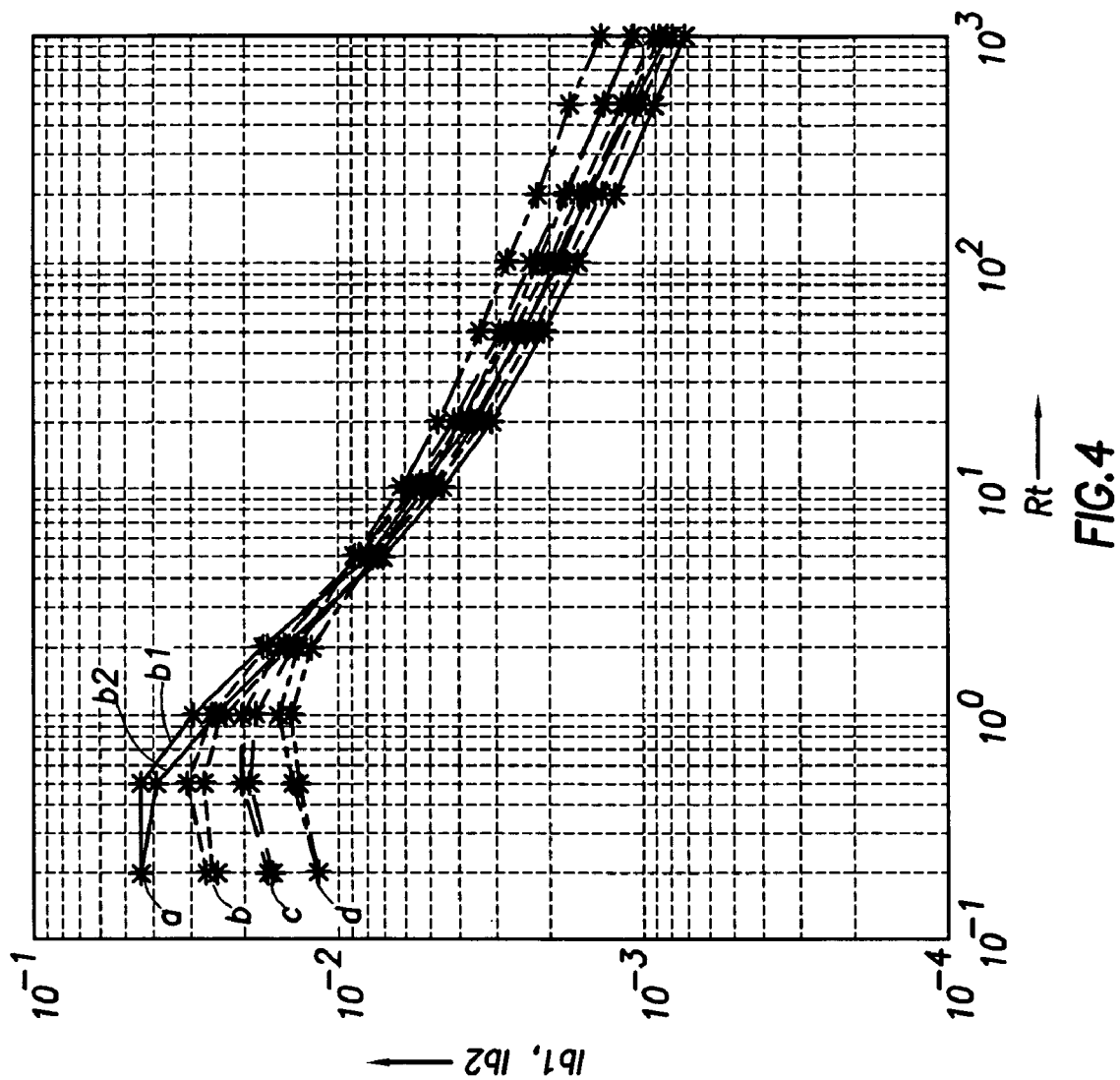
FIG. 4 shows a chart illustrating magnitudes of currents returning to the tool as a function of formation resistivity and tool standoffs.

The responses of a tool in accordance with embodiments of the invention (e.g., the HFRAB 100 shown in FIG. 2) may be simulated using a suitable program, such as the finite element simulation program sold under the trade name of FEMLAB® by COMSOL, Inc. (Burlington, Mass.). Results from a simulation of the basic responses of a simple HFRAB sensor (as shown in FIG. 2) mounted on a drill collar is shown in FIG. 4. The simulation is performed with a tool having the dimensions shown in FIG. 2 and operated with a current having a frequency of 50 MHz. To take into account the finite size of the button electrodes 12 and 13, which have 1 inch diameters in the simulation, the total currents collected by these current return electrodes are normalized according to the effective electrode surface.

The simulation was performed using the following parameters:

| | |
|---|---|
| Collar radius | 3.05 in |
| Electrode and button inner radius | 2.75 in. |
| Insulation inner radius | 2.40 in. |
| Current ring vertical thickness | 5.0 in. |
| Bottom depth of ring current electrode | 5.0 in. |
| Top depth of ring current electrode | 10 in. |
| Bottom depth of first button current electrode | 5.5 in. |
| Top depth of first button current electrode | 5.0 in. |
| Bottom depth of second button current electrode | 6.75 in. |
| Top depth of second button current electrode | 6.25 in. |
| Current source vertical insulation thickness | 5.0 in. |
| Button insulation vertical thickness | 0.25 in. |

FIG. 4 shows the results of such a simulation, in which the amplitudes of the currents measured by the button electrodes are presented as a function of total formation resistivity ($R_t$) and for different values of standoffs. Curve pairs a, b, c, and d represent 0, 0.5, 1.0 and 1.5 inch standoffs, respectively. Among each pair, the higher magnitude curve is that of the first button electrode ($I_{b1}$, shown as electrode 12 in FIG. 2) and the lower magnitude curve is that of the second electrode ($I_{b2}$, shown as electrode 13 in FIG. 2). It is apparent from FIG. 4 that the current amplitudes in general decrease as $R_t$ increases. This is expected because higher formation resistivity contributes to higher formation impedance, which in turn contributes to a higher total impedance experienced by the currents returning to the electrodes.

At high $R_t$ (e.g., >1 ohm-meter shown in FIG. 4), the formation impedance $Z_f$ is substantially greater than the impedances of mud ($Z_c$, $Z_{b1}$ or $Z_{b2}$). Therefore, the measured currents are dominated by the formation impedance ($Z_f$), hence the relationship between the measured currents ($I_{b1}$ and $I_{b2}$) and the formation resistivity ($R_t$) is mostly linear. Note that formation impedance is actually a function of both the capacitance and the resistivity of the formation. However, the capacitance of the formation is not changed in this simulation. Note also that at extremely high $R_t$, formation dielectric effects become non-negligible and the rate of decreases of the measured currents ($I_{b1}$ and $I_{b2}$) becomes slower.

At low resistivity ($R_t$=0.2 to 1 ohm-meter), the measured current magnitudes ($I_{b1}$ and $I_{b2}$) do not change as fast as they do at higher resistivities. This is because the mud impedances become substantial relative to the formation impedance, which is lower due to lower formation resistivities. As expected, at larger standoffs (e.g., curves d), the deviation from the linear relationship starts at higher $R_t$ (about 2 ohm-meter) than that (about 0.5 ohm-meter) at smaller standoffs (e.g., curves a). The inventors also found that such flattening out of the responses at low resistivities is more pronounced at lower operating frequencies (data not shown) because at lower frequencies, capacitive coupling is less efficient and the magnitudes of the mud impedances ($Z_c$, $Z_{b1}$ or $Z_{b2}$) are no longer negligible as compared to the magnitude of the formation impedance ($Z_f$).

The effects of tool standoff and mud impedances ($Z_c$, $Z_{b1}$ or $Z_{b2}$) can be explained with an analogy to the impedance of a coaxial cable. In this case, the inner radius of the "coax cable" is the tool collar radius and the outer radius of the "coax cable" is the borehole radius. When the standoff decreases, the equivalent capacitance increases, lowering the effective impedance of the mud layer surrounding either the current injector electrode (shown as 11 in FIG. 1A) or the current return electrodes (shown as 12 and 13 in FIG. 1A). As a result, the injected currents are more effectively coupled to the formations.

FIG. 4 also shows that the standoff effects are substantially identical on the currents measured by the two button electrodes. This is apparent from the fact that each pair of the curves within the same standoff have substantially identical shapes, e.g., the curves "flatten out" at the same formation resistivity. Therefore, a difference measurement between the two buttons should cancel the standoff effects. Accordingly, the formation impedance may be derived from the differential impedance measurements from the two electrodes, regardless of the tool standoffs, as shown in equation (4).

Figure 5:
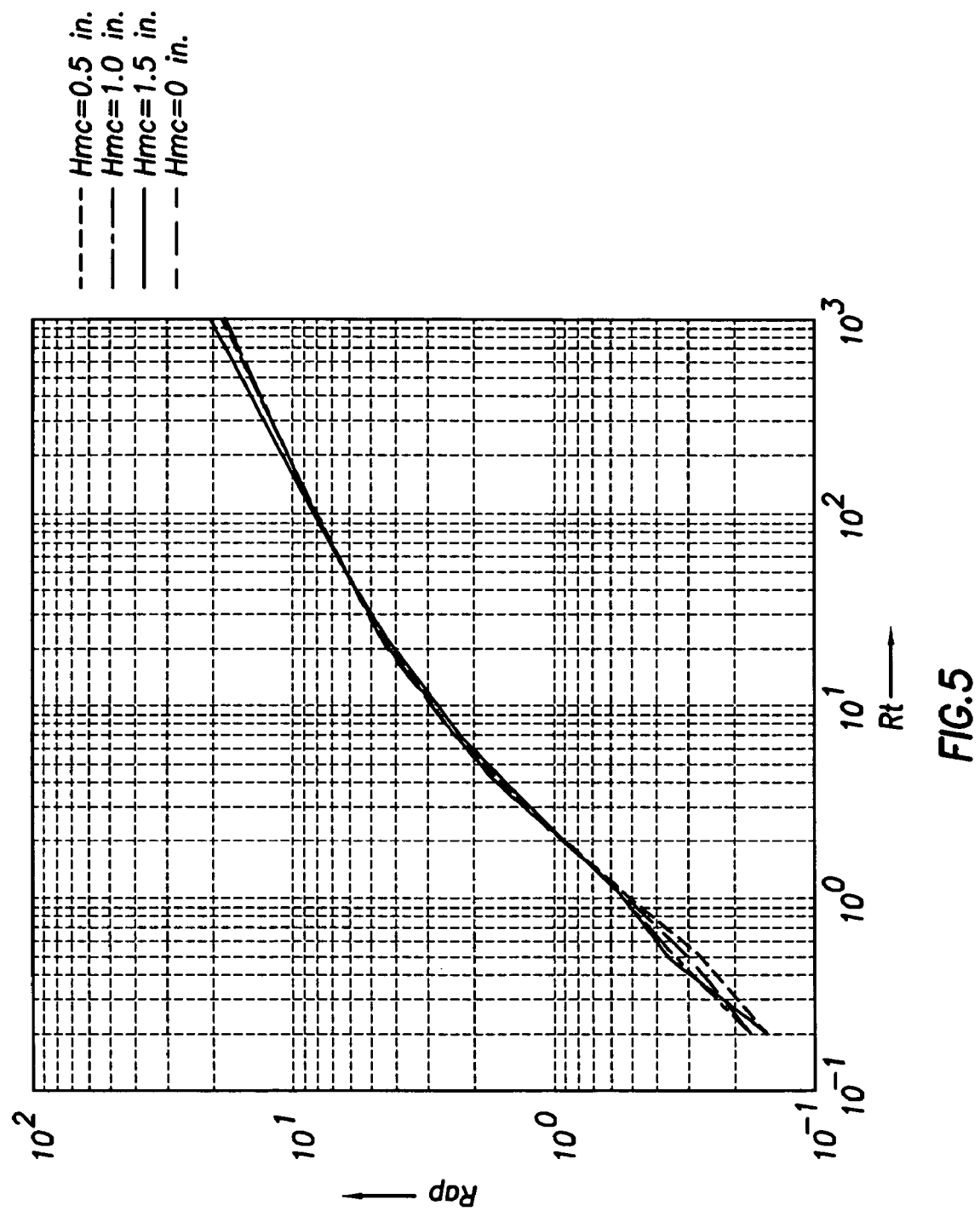
FIG. 5 shows a chart illustrating formation impedances computed from difference measurements as a function of formation resistivity and tool standoffs.

FIG. 5 shows a plot of the apparent impedance of the formation ($\Delta Z_{f12}$) in front of the two current return electrodes, which is derived from the difference measurements shown in FIG. 4, as a function of the formation resistivity ($R_t$). The formation impedance ($\Delta Z_{f12}$) is calculated according to equation (4) using results shown in FIG. 4. It is apparent from FIG. 5 that the formation impedances ($\Delta Z_{f12}$) in front of the two current return electrodes are independent of tool standoffs, but are dependent on the formation resistivities with a substantially linear relationship. However, the slope of the linear segment in the high resistivity region (e.g., $R_t > 20$ ohm-meter) is different from that in the low resistivity region (e.g., $R_t < 10$ ohm-meter). This change in the slopes most likely arises from the fact that dielectric effects become non-negligible in high resistivity formations.

The above simulation shows that the formation impedance ($\Delta Z_{f12}$) can be derived from difference measurements using two electrodes. This approach is valid only if the mud impedances in front of the two electrodes are substantially the same or if the differences are negligible when compared to the formation impedance, i.e., $Z_{b1} \approx Z_{b2}$ or $|Z_{b1} - Z_{b2}| < \Delta Z_{f12}$. If this condition is not met, then there will be substantial errors in using equation (4) to approximate the formation impedance. In this case, other approaches may be needed to either monitor the standoff effects or to eliminate the standoff effects.

In accordance with one embodiment of the invention, an HFRAB tool is equipped with three or more current return electrodes 12, 13, and 14 (shown in FIG. 6) for providing a compensated difference measurement and for monitoring the standoff effects. This tool is similar to that shown in FIG. 1; however, it includes an additional current return electrode 14. The currents measured by the three current return electrodes 12, 13, 14 can be used to monitor whether the mud impedances in front of these current return electrodes 12, 13, 14 are substantially identical.

Figure 6:
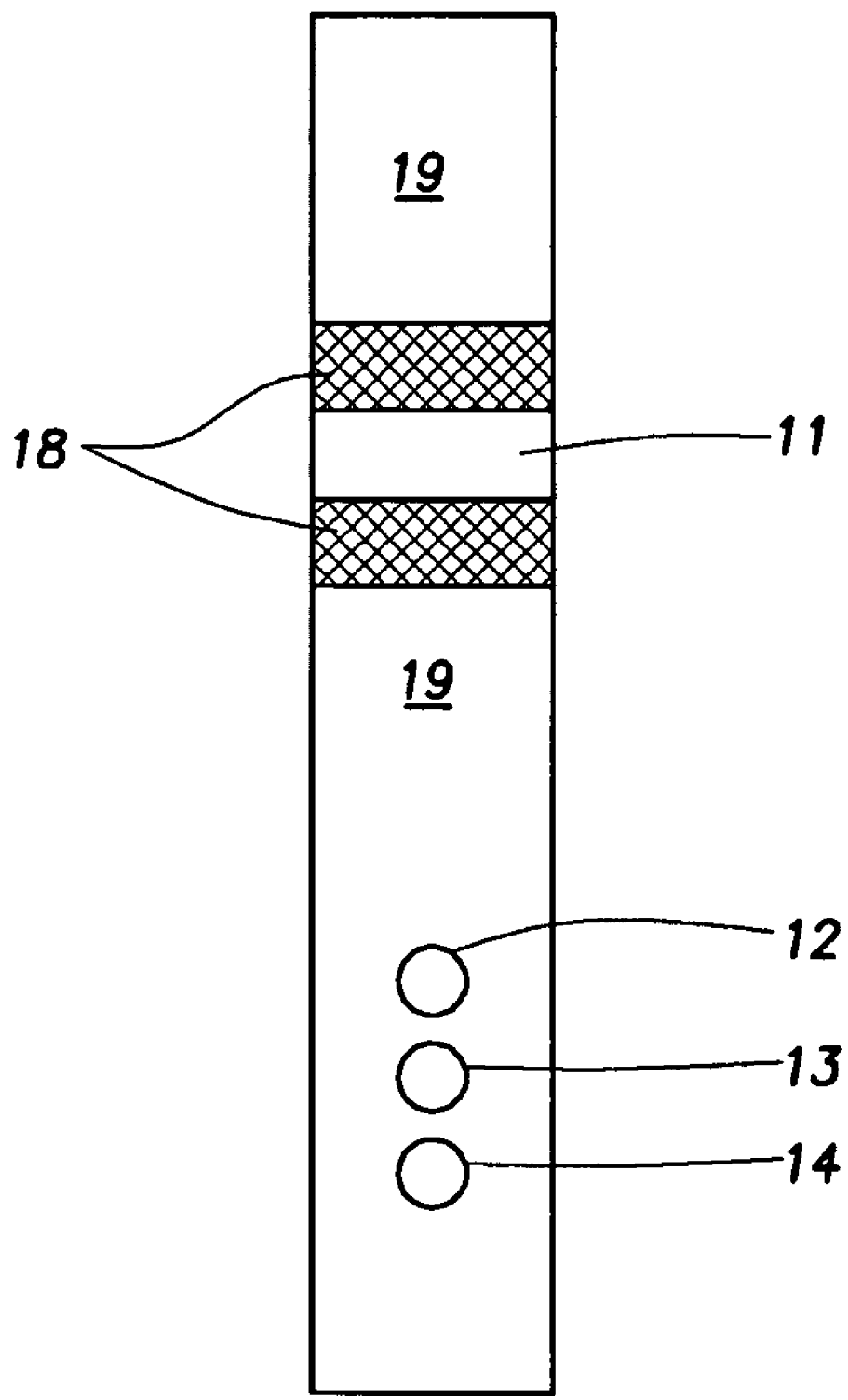
FIG. 6 shows a resistivity logging sensor in accordance with another embodiment of the invention.
Figure 7:
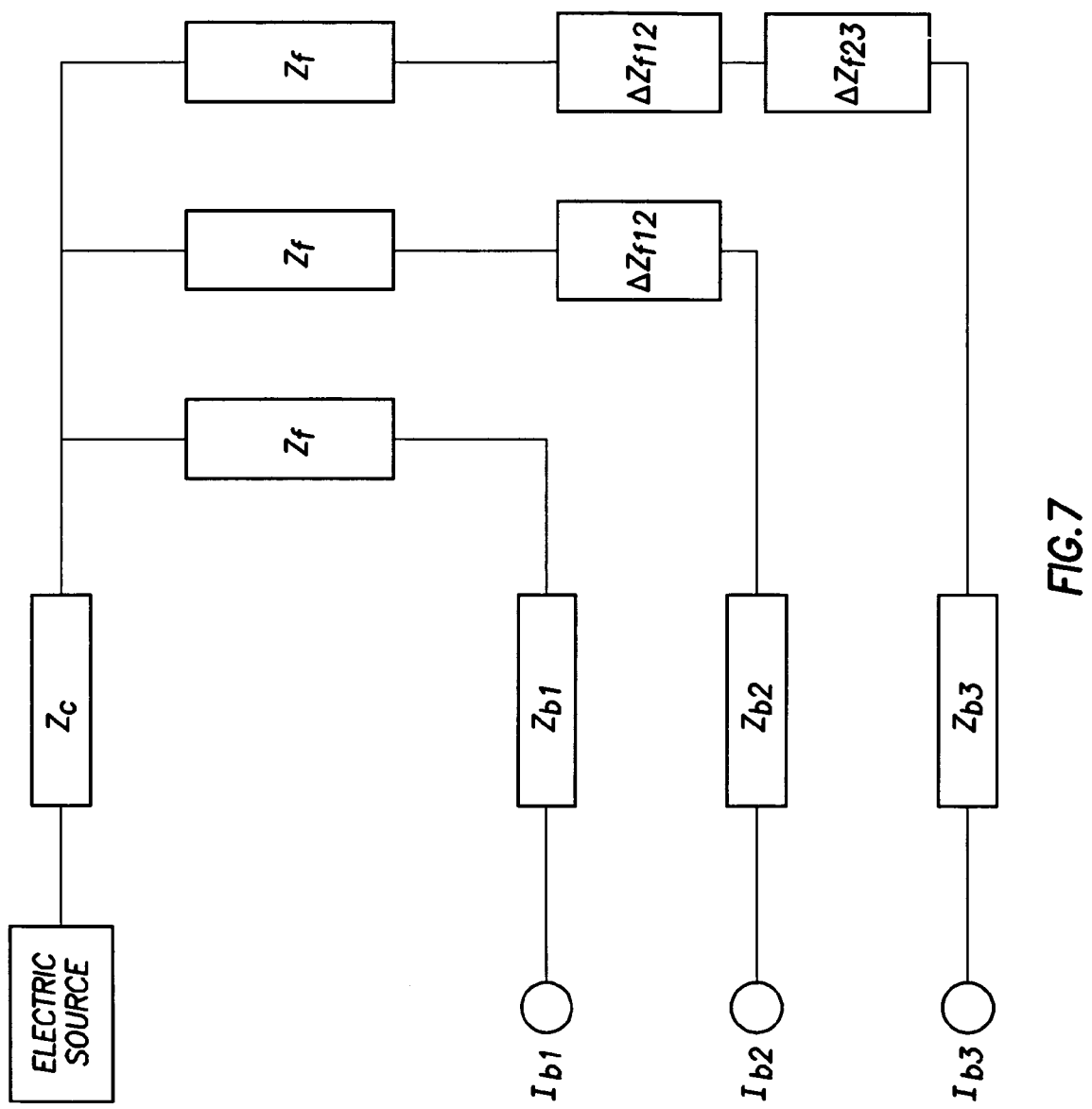
FIG. 7 shows a schematic of various impedance encountered by currents injected into a formation and returning to electrodes according to a sensor of FIG. 6.

FIG. 7 shows a schematic illustrating three conductive paths leading to each of the three current return electrodes 12, 13, 14 shown in FIG. 6. As shown, the currents that return to electrodes 12 and 13 will experience impedances as shown in equations (1) and (2), respectively. Equations (1) and (2) are reproduced below for easy comparison. The current returning to electrode 14 will experience a total impedance as shown in equation (5):

$$\frac{V}{I_{b1}} = Z_C + Z_f + Z_{b1} \quad (1)$$

$$\frac{V}{I_{b2}} = Z_C + Z_f + \Delta Z_{f12} + Z_{b2} \quad (2)$$

-continued $$\frac{V}{I_{b3}} = Z_C + Z_f + \Delta Z_{f12} + \Delta Z_{f23} + Z_{b3} \quad (5)$$

where $\Delta Z_{f23}$ represents the formation impedance in front of button electrodes 13 and 14, $Z_{b3}$ is the impedance in front of electrode 14, and other terms have the same meanings as previously defined in reference to equation (2).

Taking the sum and difference between equations (1) and (5) yields:

$$\frac{1}{2}\left(\frac{V}{I_{b3}} - \frac{V}{I_{b1}}\right) = \frac{1}{2}(\Delta Z_{f12} + \Delta Z_{f23}) + \frac{1}{2}(Z_{b3} - Z_{b1}) \quad (6)$$

$$\frac{1}{2}\left(\frac{V}{I_{b3}} + \frac{V}{I_{b1}}\right) = Z_C + Z_f + \frac{1}{2}(\Delta Z_{f12} + \Delta Z_{f23}) + \frac{1}{2}(Z_{b1} + Z_{b3}) \quad (7)$$

Equation (6) provides a compensated difference measurement, while equations (2) and (7) return similar values, only if $\Delta Z_{f12} = \Delta Z_{f23}$ and $Z_{b2} = \frac{1}{2}(Z_{b1} + Z_{b3})$. Over zones where rock formation parameters do not change significantly (i.e., $\Delta Z_{f12} \approx \Delta Z_{f23}$), equations (2) and (7) will give different values whenever the standoff effects are different in front of the current return electrode 12 and 14. Therefore, a comparison between the values obtained from equations (2) and (7) provides a standoff quality flag (or monitor).

Figure 8:
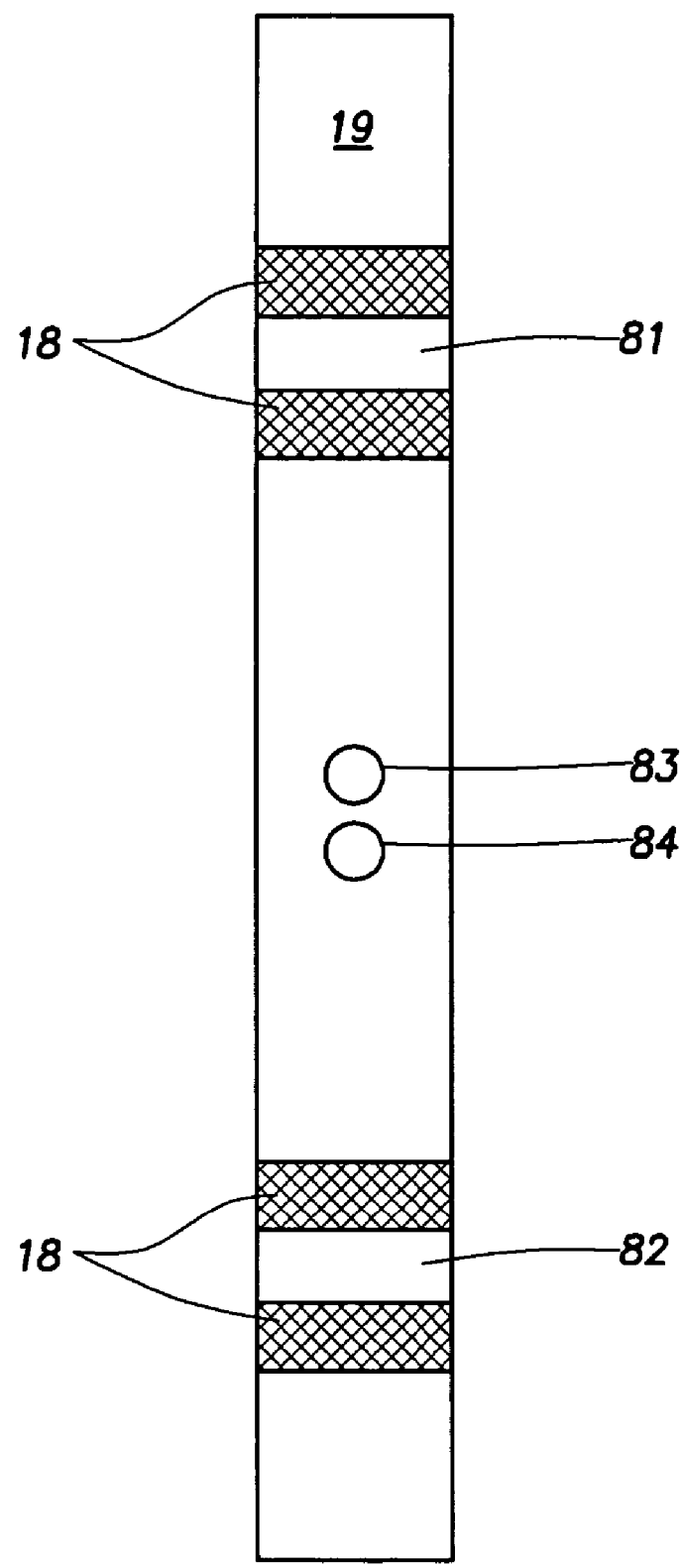
FIG. 8 shows a resistivity logging sensor in accordance with another embodiment of the invention.

Some embodiments of the invention provide tools and methods for canceling the standoff effects. FIG. 8 shows a resistivity tool in accordance with one embodiment of the invention. As shown, the tool 800 includes two current injector electrodes 81, 82 that are equally spaced from the two current return electrodes 83 and 84. These electrodes are similar to those shown in FIG. 1 and are similarly arranged. Thus, the main difference between the tool 100 shown in FIG. 1A (or FIG. 2) and the tool 800 shown in FIG. 8 lies in the inclusion of an additional current injector electrode 82 in tool 800. Thus, the equations described with reference to tool 100 in FIG. 1 (or FIG. 2) are generally applicable to the tool 800 in FIG. 8.

If the current injector electrodes 81 and 82 are energized at different times (i.e., by time multiplexing), then two sets of measurements may be acquired with the current return electrodes 83, 84. When the upper current injector electrode 81 is energized, the impedance obtained from the difference measurements between the two button electrodes 83 and 84 is as follows:

$$\frac{V}{I_{b2}^{UP}} - \frac{V}{I_{b1}^{UP}} = \Delta Z_{f12}^{UP} + Z_{b2}^{UP} - Z_{b1}^{UP} \quad (8)$$

where UP indicates that the upper current injector electrode 81 is energized. Similarly, if the lower (down) current injector electrode 82 is energized, the impedance of the formation can be obtained from the difference measurements between the two button electrodes 83 and 84 as follows:

$$\frac{V}{I_{b1}^{DN}} - \frac{V}{I_{b2}^{DN}} = \Delta Z_{f21}^{DN} + Z_{b1}^{DN} - Z_{b2}^{DN} \quad (9)$$

where DN indicates that the lower (down) current injector electrode 82 is energized.

Because of the symmetry, if the formation properties do not vary substantially within the region of investigation, then the following approximate equalities may be obtained: $Z_{b1}^{UP}=Z_{b1}^{DN}$, $Z_{b2}^{UP}=Z_{b2}^{DN}$, and $\Delta Z_{f12}^{UP}=\Delta Z_{f21}^{DN}=\Delta Z_{f12}$.

Therefore, an average formation impedance can be obtained by taking the average of equations (8) and (9):

$$\frac{1}{2}\left[\frac{V}{I_{b2}^{UP}} - \frac{V}{I_{b1}^{UP}} + \frac{V}{I_{b1}^{DN}} - \frac{V}{I_{b2}^{DN}}\right] = \Delta Z_{f12} \quad (10)$$

Equation (10) shows that the average of the UP and DOWN differential impedance measurements between the two current return electrodes 83, 84 depends only on the formation properties in the region adjacent to the two current return electrodes 83, 84. Therefore, the formation impedance obtained using equation (10) is immune to tool standoff effects. That is, the tool 800 shown in FIG. 8 is standoff-compensated.

While the above description assumes that the current injector electrodes 81 and 82 are energized at different times (time multiplexing) to provide the two sets of measurements, one of ordinary skill in the art would appreciate that an alternative approach is to operate the two current injector electrodes 81 and 82 at different frequencies (frequency multiplexing). With frequency multiplexing, then both electrodes 81 and 82 may be energized simultaneously. Both approaches (time and frequency multiplexing) are expressly within the scope of the present invention.

Figure 9A:
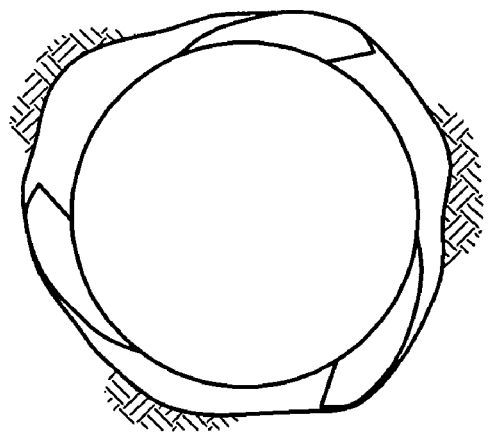
FIG. 9A shows a cross section view of a PowerDrive and three deployable pads in a wellbore.

Some embodiments of the invention relate to tools and methods of resistivity measurements that minimize or eliminate tool standoff effects using articulated pads. As shown in FIG. 9, a resistivity measurement sensor (such as those shown in FIGS. 1, 6, 8, or a variant thereof) may be included on a pad of a drilling/logging tool. Deployable pads have been extensively used in wireline tools to minimize logging tool standoffs and to maximize and maintain sensor contacts with the borehole wall. The use of deployable pads in LWD or MWD tools is rare due to the harsh conditions encountered during drilling. Recently, a PowerDrive™ tool is introduced by Schlumberger Technology Corporation (Houston, Tex.). The PowerDrive™ tools include hydraulically controlled pads that may be used to steer the drill bit by a push-the-bit mechanism. In addition, the three pads of a PowerDrive™ tool can deployed to produce boreholes with much less rugosity and dogleg severity. FIG. 9A shows a cross sectional view of a collar equipped with three PowerDrive™ pads 91 disposed on a PowerDrive™ tool 90 that is in the process of drilling a borehole 95.

The deployable pads on a PowerDrive™ tool may also be used to include sensors for formation property measurements. Some embodiments of the present invention include HFRAB sensors on at least one pad of a PowerDrive™ directional drilling tool. By using the deployable pads, the sensor of the invention may maintain its contact with the borehole wall to eliminate or minimize standoff effects.

Figure 9B:
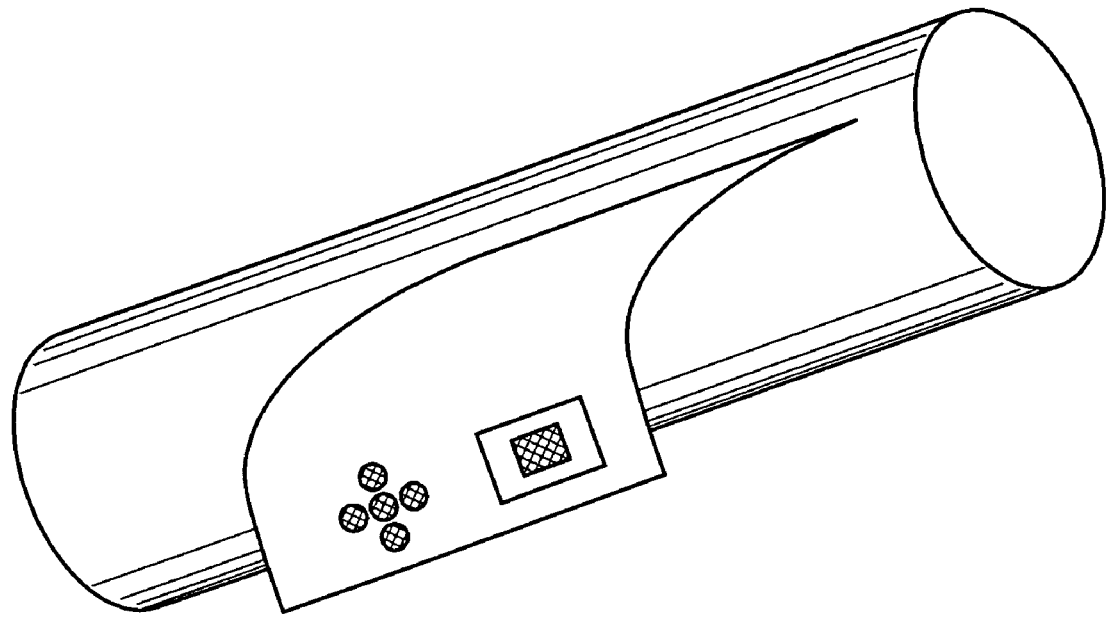
FIG. 9B shows a downhole tool having a resistivity logging sensor disposed on a deployable pad on the downhole tool in accordance with one embodiment of the invention.

FIG. 9B shows a HFRAB in accordance with one embodiment of the invention disposed on one of the Power Drive pads. As shown, the HFRAB includes a current injector electrode 92 and five button electrodes 93 arranged in an array. Note that the HFRAB tool shown is for illustration, and other variations (e.g., with different number of current return electrodes) may also be used without departing from the scope of the invention. Furthermore, while FIG. 9B shows that the current injector electrode and the current return electrodes are all included on the deployable pads, other configurations are possible and are expressly within the scope of the invention. For example, the current injector electrode may be included on the collar and the current return electrodes included on the deployable pads.

Experience from RAB™ and GVR™ shows that a 1 in. button is sufficient for most geosteering applications. By providing an array of 5 buttons spaced at 1 inch apart (as shown in FIG. 9B), it is possible to achieve a 1 in. resolution when measurement form each electrode is analyzed separately. On the other hand, by adding the currents from all the current return electrodes, as if the electrode array were a single large button electrode, it is possible to obtain more reliable measurements.

Figure 10:
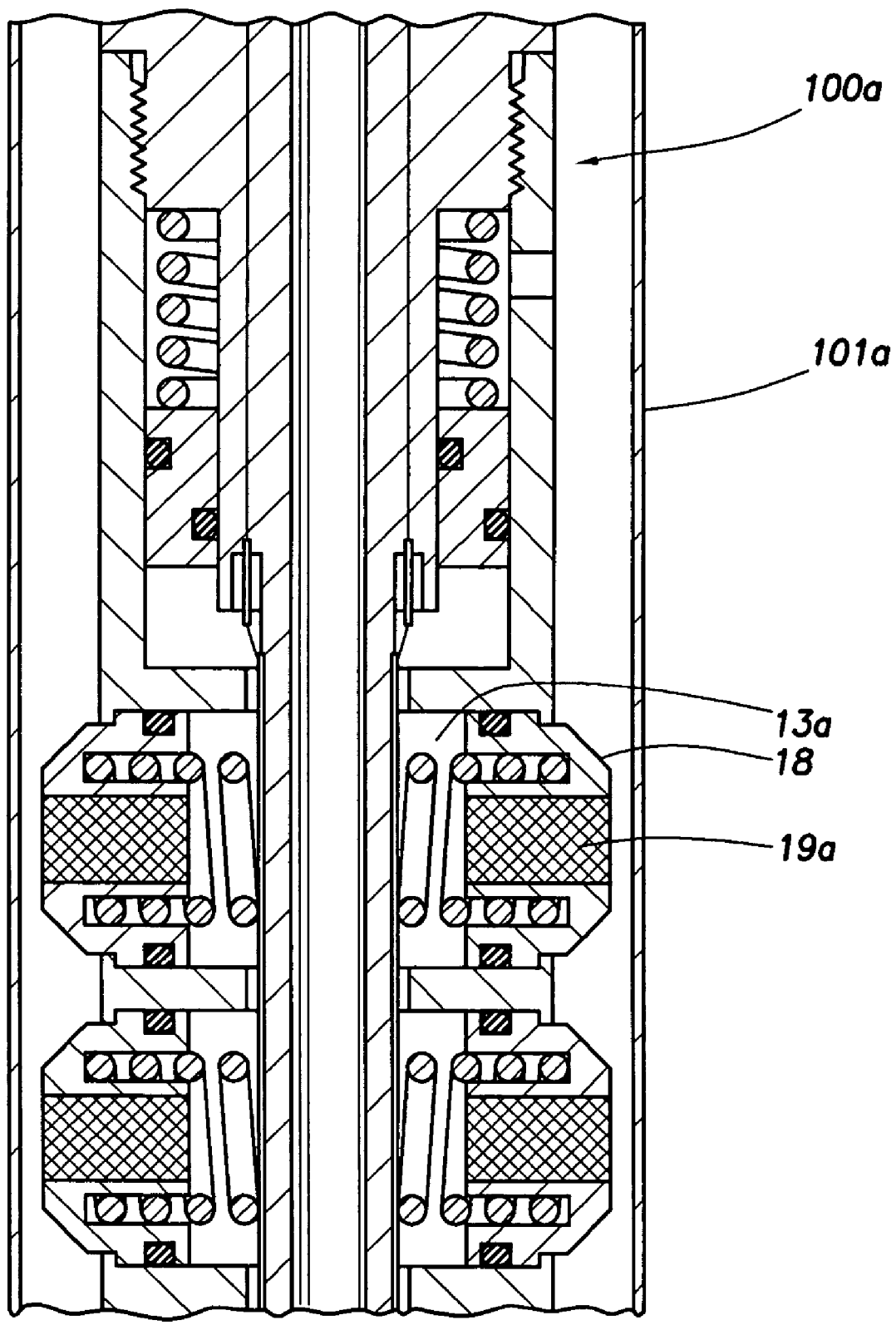
FIG. 10 shows a downhole tool having extendable pistons for including a resistivity logging sensor in accordance with one embodiment of the invention.

Co-pending U.S. patent application Ser. No. 10/605,200 filed on Sep. 15, 2003, by Homan et al. discloses pressure-compensated pistons for use in LWD or MWD logging tools. This application is incorporated by reference in its entirety. The pressure-compensated pistons disclosed in this application function similarly to the PowerDrive™ deployable pads. FIG. 10 shows a tool 100a having four pressure-compensated pistons 18a in accordance with this co-pending application. The pistons 18a have fluid-filled reservoirs 13a that are kept at a pressure substantially identical to the pressure outside the tool (e.g., the pressure in a borehole 101a). The pistons 18a may be deployed, for example, by a bias force from the springs 23a behind the pistons. Each piston 18a includes a pad 19a, which may be used to include desired sensors, such as the HFRAB sensors of the present invention.

Figure 11:
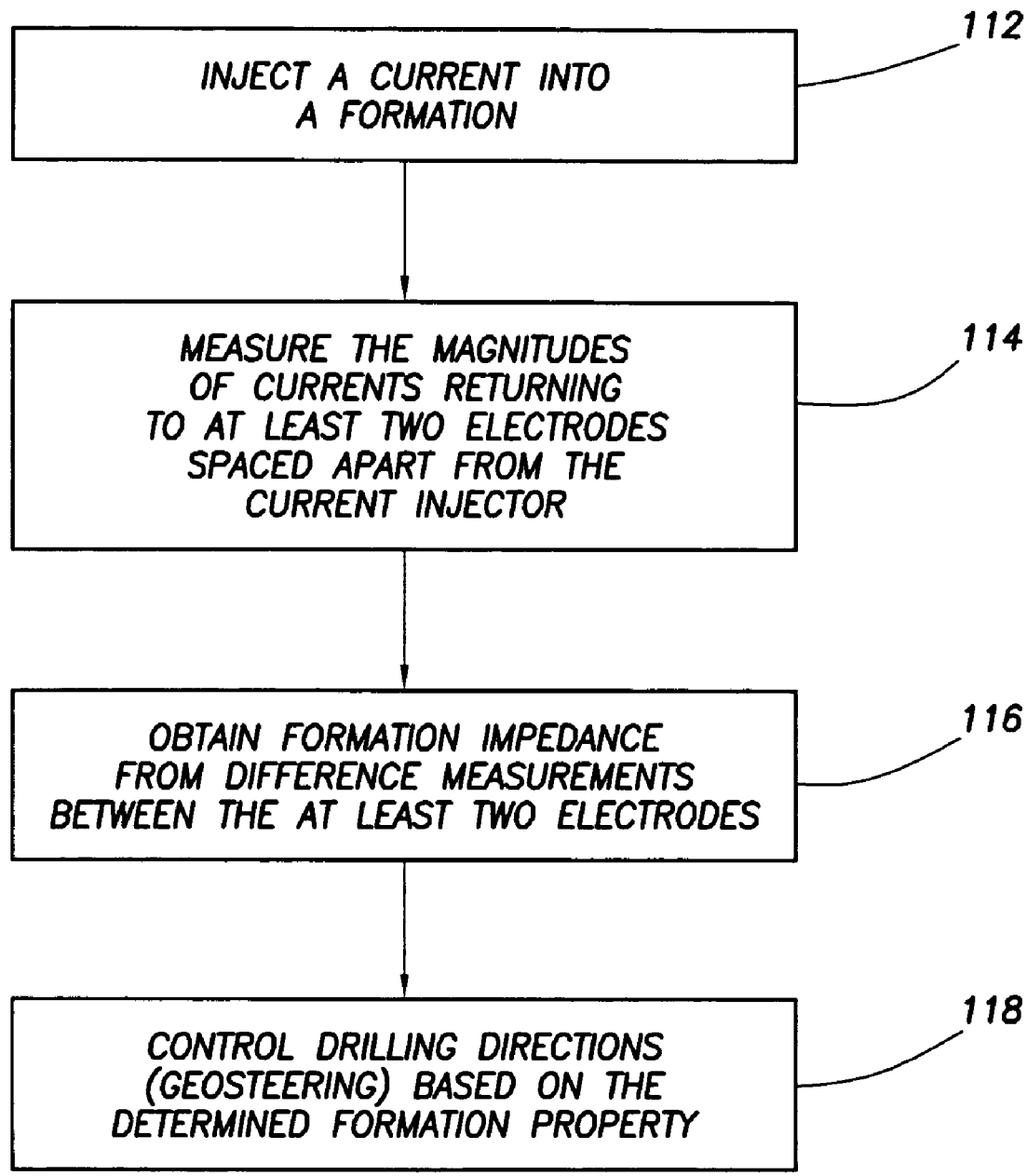
FIG. 11 illustrates a method of resistivity logging and geosteering in accordance with one embodiment of the invention.

FIG. 11 shows a method for measuring a formation property in accordance with one embodiment of the invention. A resistivity sensor, such as that shown in FIG. 1A or FIG. 8, is disposed in a borehole drilled with OBM. A current from a current injector electrode is injected through the OBM in the borehole and into the formation (step 112). In some embodiments of the invention, two current injectors are provided (see FIG. 8). The two current injectors may be energized at different times or at different frequencies to provide two sets of measurements for canceling the standoff effects. Currents that travel in the formation and return to the measurement electrodes are measured. In preferred embodiments, at least two electrodes disposed at a distance from the current injector electrode are used to measure the return currents (step 114). The measurements may be performed with the sensor pressed against borehole wall, if the sensor is disposed on a disployable pads as in a PowerDrive™ tool or on a piston as shown in FIG. 10.

The measured current magnitudes from the at least two measurement electrodes are analyzed to provide the formation impedance (step 116). In accordance with one embodiment of the invention, the magnitudes of the measured currents are subtracted to give a difference measurement that provides an indication of the formation impedance regardless of the tool standoff. In accordance with another embodiment of the invention, at least three measurement electrodes are used to measure the return currents. Then, a comparison between the magnitudes of the currents detected by the electrodes are used to monitor the tool standoff effects and to derive formation impedances. If the measurements were made with two current injectors (see FIG. 8), then the two sets of measurements may be used to cancel the effects of tool standoffs. That is the two sets of measurements may be used to derived "standoff-compensated" measurements of formation impedance.

Finally, the derived formation impedance, the measured return currents, voltages, of the difference measurements between two or more electrodes may be used to monitor the environment of the LWD tool. Accordingly, these parameters may be used to control the drilling directions as in geosteering (step 118).

Advantages of the invention may include the following. A sensor capable of measuring the resistivity of a formation drilled with OBM. The sensor can provide high resolution images of the borehole. The resistivity sensors in accordance with the invention may used with an LWD or MWD tool. The resistivity sensor may be disposed on deployable pads or extendable buttons on the LWD or MWD tools so that the sensor can contact the borehole wall to minimize the resistivity barrier of the OBM.

Methods of the invention can provide indications of tool standoffs and/or compensate for tool standoffs. Thus, the resistivity measurements obtained using a sensor of the invention are not sensitive to tool standoffs. These measurements may be used to control the drilling directions.

While the invention has been described with respect to a limited number of embodiments, those skilled in the art, having benefit of this disclosure, will appreciate that other embodiments can be devised which do not depart from the scope of the invention as disclosed herein. Accordingly, the scope of the invention should be limited only by the attached claims.

What is claimed is:

1. A sensor for logging a formation resistivity while drilling a well using an oil-based mud, comprising:
    a sensor body;
    a first current injector electrode disposed on the sensor body, wherein the first current injector electrode is electrically insulated from the sensor body;
    at least two current return electrodes disposed on the sensor body at a selected distance from the first current injector electrode, wherein the at least two current return electrodes are disposed proximate to each other and are electrically insulated from the sensor body; and
    an electrical source configured to energize the first current injector electrode with a current having a voltage of no less than 50 mvolts and a frequency of no less than 1 KHz.

2. The sensor of claim 1, wherein the electrical source is configured to energize the first current injector electrode with a current having a voltage in a range from 50 mvolts volts to 1000 volts end a frequency in a range from 1 KHz to 1.5 GHz.

3. The sensor of claim 1, wherein the electrical source is configured to energize the first current injector electrode with a current having a voltage of about 100 volts and a frequency of about 50 MHz.

4. The sensor of claim 1, wherein the first current injector electrode is a ring electrode and the at least two current return electrodes are button electrodes.

5. The sensor of claim 1, wherein the at least two current return electrodes are separated from each other by about 1 inch.

6. The sensor of claim 1, wherein the sensor body is part of a drill collar.

7. The sensor of claim 1, wherein the sensor body is part of a deployable pad of a downhole tool.

8. The sensor of claim 1, wherein the sensor body is part of a downhole tool, and wherein the first current injector electrode is disposed on a drill collar and the at least two current return electrodes are disposed on at least one deployable pad of the downhole tool.

9. The sensor of claim 1, wherein the at least two current return electrodes comprise three current return electrodes arranged in a linear configuration with an substantially equal distance between each neighboring pair.

10. The sensor of claim 9, wherein the substantially equal distance is about 1 inch.

11. The sensor of claim 9, wherein the first current injector electrode is a ring electrode and the three current return electrodes are button electrodes.

12. The sensor of claim 9, wherein the electrical source is configured to energize the first current injector electrode with a current having a voltage of about 100 volts and a frequency of about 50 MHz.

13. The sensor of claim 9, wherein the sensor body is part of a drill collar.

14. The sensor of claim 9, wherein the sensor body is part of a deployable pad of a downhole tool.

15. The sensor of claim 9, wherein the sensor body is part of a downhole tool, and wherein the first current injector electrode is disposed on a drill collar and the three current return electrodes are disposed on at least one deployable pad of the downhole tool.

16. The sensor of claim 1, further comprising a second current injector electrode disposed on the sensor body and spared apart from the first current injector electrode such that the first current injector electrode anti the second current injector electrode are substantially symmetrically displaced from the at least two current return electrodes.

17. The sensor of claim 1, wherein the first and second current injector electrodes are ring electrodes and the at least two current return electrodes are button electrodes.

18. The sensor of claim 16, wherein the electrical source is configured to energize the first current injector electrode and the second current injector electrode with a current having a voltage of about 100 volts and a frequency of about 50 MHz.

19. The sensor of claim 16, wherein the sensor body is part of a drill collar.

20. The sensor of claim 16, wherein die sensor body is part of a deployable pad of a downhole tool.

21. The sensor of claim 16, wherein the first and second current injector electrodes are energized at different times.

22. The sensor of claim 16, wherein the first and second current injector electrodes are energized with different frequencies.

23. A method for determining a formation property while drilling a well using an oil-based mud, comprising:
    injecting a current into a formation by energizing a current injector electrode;
    measuring a property of a fast current returning to a first current return electrode disposed at a distance from the current injector electrode;
    measuring a property of a second current returning to a second current return electrode disposed proximate the first current return electrode; and
    determining the formation property from a difference measurement derived from the property of the first current and the property of the second current.

24. The method of claim 23, wherein the formation property is a formation impedance or a formation resistivity.

25. The method of claim 23, wherein the property of the first current and the property of the second current relate to one selected from a signal amplitude, a phase shift, an and amplitude attenuation.

26. The method of claim 23, further comprising:
    measuring a property of a third current returning to a third current return electrode disposed proximate the second current return electrode, wherein the second current return electrode is disposed at an substantially equal distance to the first current return electrode and the third current return electrode; and comparing the property of the first current, the property of the second current, and the property of the third current to monitor a tool standoff effect.

27. The method of claim 23, further comprising controlling a drilling direction based on a parameter selected from the determined formation property, the property of the first current, the property of the second current, the difference measurement, and a combination thereof.

28. A method for determining a formation property, comprising:

injecting a first current into a formation by energizing a first current injector electrode;

measuring a property of a first current returning to a first current return electrode disposed at a distance from the first current injector electrode;

measuring a property of a second current returning to a second current return electrode disposed proximate the first current return electrode;

injecting a second current into the formation by energizing a second current injector electrode;

measuring a property of a third current returning to the first current return electrode;

measuring a property of a fourth current returning to the second current return electrode; and determining the formation property from a difference measurement derived from the property of the first current, the property of the second current, the property of the third current, and the property of the fourth current.

29. The method of claim 28, wherein the formation property is a formation impedance or a formation resistivity.

30. The method of claim 28, wherein the method is performed while drilling a well using an oil-based mud.

31. The method of claim 30, further comprising controlling a drilling direction based on one selected from the derived formation impedance, the property of the first current, the property of the second current, the property of the third current, the property of the fourth current, and the difference measurement.

32. The method of claim 28, wherein die injecting the first current and the injecting the second current are performed at different time.

33. The method of claim 28, wherein the injecting the first current and the injecting the second current are performed at different frequencies.

* * * * *